US008671884B2

(12) United States Patent
Gehm et al.

(10) Patent No.: US 8,671,884 B2
(45) Date of Patent: Mar. 18, 2014

(54) MILKING MACHINE ATTACHMENT AID

(76) Inventors: Lanny Gehm, Lisle, NY (US); William Gehm, Lisle, NY (US)

(*) Notice: Subject to any disclaimer, the term of this patent is extended or adjusted under 35 U.S.C. 154(b) by 55 days.

(21) Appl. No.: 13/094,977

(22) Filed: Apr. 27, 2011

(65) Prior Publication Data
US 2012/0272901 A1 Nov. 1, 2012

(51) Int. Cl.
*A01J 5/00* (2006.01)
*A01J 5/04* (2006.01)
*A01J 3/00* (2006.01)

(52) U.S. Cl.
USPC .......... 119/14.02; 119/14.49; 119/14.52; 119/14.08; 119/14.38; 119/14.45

(58) Field of Classification Search
USPC .......... 119/14.02, 14.01, 14.08, 14.47, 14.41, 119/14.14, 14.38, 14.44, 14.28, 14.49, 119/14.46, 14.37, 14.19, 14.18, 14.45
See application file for complete search history.

(56) References Cited

U.S. PATENT DOCUMENTS

| | | | | |
|---|---|---|---|---|
| 3,556,053 A | * | 1/1971 | Padman et al. | 119/14.08 |
| 3,690,300 A | * | 9/1972 | Tonelli | 119/14.08 |
| 4,011,838 A | * | 3/1977 | Nordegren et al. | 119/14.08 |
| 4,190,021 A | | 2/1980 | Reisgies | |
| 4,572,104 A | | 2/1986 | Rubino | |
| 4,838,207 A | * | 6/1989 | Bom et al. | 119/14.02 |
| 5,697,325 A | * | 12/1997 | Gehm et al. | 119/14.28 |
| 6,045,331 A | * | 4/2000 | Gehm et al. | 417/2 |
| 7,634,972 B2 | * | 12/2009 | Peles | 119/14.31 |
| 2005/0072362 A1 | | 4/2005 | Innings | |
| 2008/0202433 A1 | | 8/2008 | Duke | |
| 2009/0229527 A1 | * | 9/2009 | Mader et al. | 119/14.47 |

FOREIGN PATENT DOCUMENTS

| | | | | |
|---|---|---|---|---|
| WO | | 2010006986 A2 | 1/2010 | |
| WO | WO 2010/006986 | * | 1/2010 | A01J 5/08 |

OTHER PUBLICATIONS

International Search Report for PCT/US2012/023733 Issued on Sep. 25, 2012.
Dam Rasmussen, Morten, "Overmilking and Teat Condition." NMC Annual Meeting Proceedings (2004), p. 169-175.
Mein, Graeme et al. "Milking Machines and Mastitis Risk: A Storm in a Teatcup." Paper presented at the 2004 meeting of the National Mastitis Council.
GEA Farm Technologies. 2009 Liner Module presentation. 2009. http://dairyfoods.wisc.edu/assets/liner%20copy.pdf.

* cited by examiner

*Primary Examiner* — Andrea Valenti
(74) *Attorney, Agent, or Firm* — Brown & Michaels, PC

(57) ABSTRACT

A method of attaching and/or removing a teat cup from an animal with a liner inflatable and deflatable by a pulsator which alternately introduces air and vacuum to a pulsation chamber surrounding the liner. The method comprising the steps of: setting the pulsator to constantly introduce vacuum to the pulsation chamber to open and maintain the liner in an open position for an attachment time period; attaching the teat cup to the animal during the attachment time period; setting the pulsator to alternate between introducing air and vacuum to the pulsation chamber during a milking time period to milk the animal; and removing the teat cup from the animal.

8 Claims, 3 Drawing Sheets

MILKING MACHINE ATTACHMENT AID

FIELD OF THE INVENTION

The present invention pertains to an improvement of a milking system for domesticated animals and, more particularly to a milking system with a milking machine aid.

DESCRIPTION OF RELATED ART

Typical milking systems apply periodic alternating pressure to the teat cup of a milking apparatus, as shown in FIG. 1. This results in the removal and the flow of milk from the udder to the teat cup which the teat cup is applied to the teat. The alternating pressure between the atmospheric pressure and vacuum cycles is controlled by a valving apparatus that feeds a pulsation chamber which is the volume between a liner and a teat cup shell. This valving apparatus is commonly referred to as a pulsator. Conventional milking machines operate the pulsator from a time period prior to machine attachment to the animal, causing the liner to periodically open and close as the machine is being attached to the animal creating alternation milk and rest phases.

U.S. Pat. No. 4,190,021 discloses a milking machine providing a means of maintaining the liner in a closed position for a defined period of time following attachment of the milking machine. This design seeks to achieve the opposite liner action of the present invention, and attempts to hold the liner in a closed position.

U.S. Pat. No. 4,572,104 discloses a method of milking where the milking action is initiated at a first milk-to-rest ratio for the milk period and then increased to a selected higher ratio. Milking is then done at the selected higher ratio for a selected segment of time or until the milk flow rate falls below a predetermined value, after which the ratio is decreased so that milking is completed at a lower ratio.

Therefore, the typical approach of prior art pulsator designs has been to periodically open and close the liner during the attachment of the milking machine and to then maintain that constant periodic rate, vary the rate or to hold the liner in a closed position for a limited duration of time.

SUMMARY OF THE INVENTION

A method of attaching and/or removing a teat cup from an animal with a liner inflatable and deflatable by a pulsator which alternately introduces air and vacuum to a pulsation chamber surrounding a liner. The method comprising the steps of: setting the pulsator to constantly introduce vacuum to the pulsation chamber to open and maintain the liner in an open position for an attachment time period; attaching the teat cup to the animal during the attachment time period; setting the pulsator to alternate between introducing air and vacuum to the pulsation chamber during a milking time period to milk the animal; and removing the teat cup from the animal.

The teat cup may be removed from the animal by setting the pulsator to constantly introduce vacuum to the pulsation chamber to open and maintain the liner in an open position for a removal time period.

The attachment time period, milking time period and removal time period may be started and stopped manually or may be automated or a combination thereof.

The attachment time period, milking time period and removal time period may end after an allotted time period.

The milking time period may end based on milk flow from the animal.

DETAILED DESCRIPTION OF THE INVENTION

Figure 2:
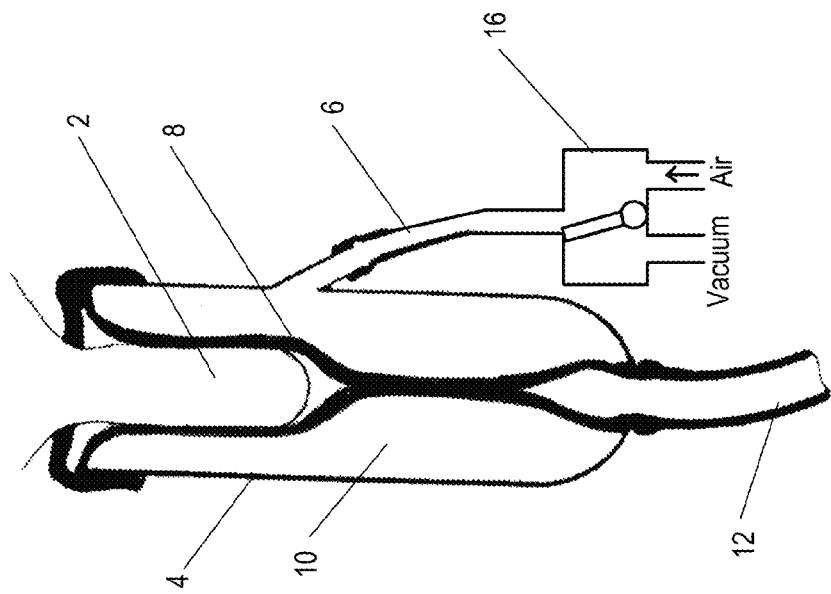
FIG. 2 illustrates a teat cup with the milking liner in open position that enables the flow of milk from the animal.
Figure 3:
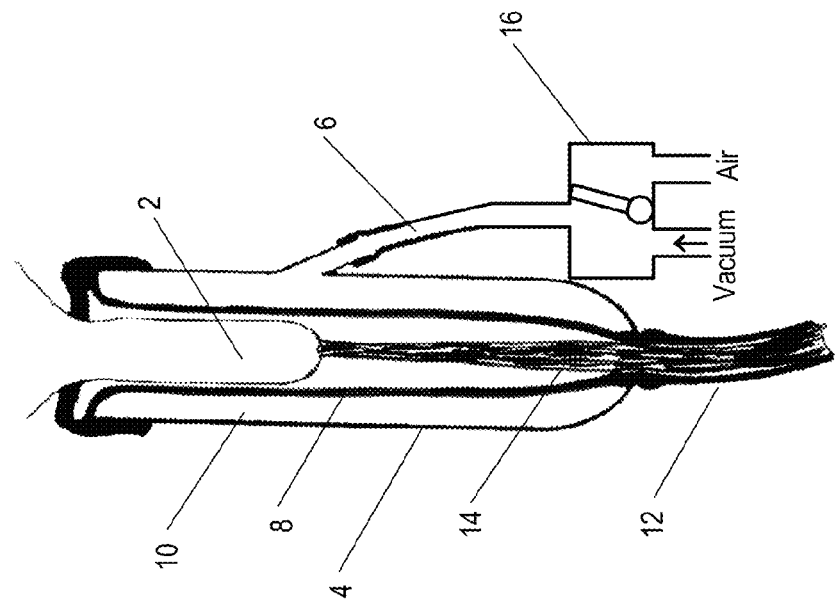
FIG. 3 illustrates a teat cup with the milk liner in the closed position.

FIGS. 2-3 show a typical milking system which integrates the pulsator 16 with a teat cup 4 and claw (not shown). The teat cup 4 contains an inflatable liner 8 that, when alternately pressurized and depressurized, allows the udder to release its milk 14. During milk phase, the milk 14 flows out of the udder when the liner 8 is opened. The milk then flows into the claw (not shown) a hollow chamber that serves as a collection unit for a plurality of teat cups through the milk tube 12. Milk 14 gathered by the claw is then transported to a series of hoses and pipes, terminating at a storage tank.

A typical milking system will periodically supply air and vacuum to the pulsation chamber 10 while the machine is being attached to the animal and continue to periodically supply air and vacuum to the pulsation chamber 10 while the animal is being milked. Some milking machines are known to vary the rate of the periodic change between air and vacuum during the attachment time period. The closing of the liner 8 while the machine is being attached can result in either the incomplete insertion of the teat 2 into the liner 8 or can result in the teat 2 not being properly aligned with the liner 8. Either condition can result in reduced milking performance for the animal.

Figure 1:
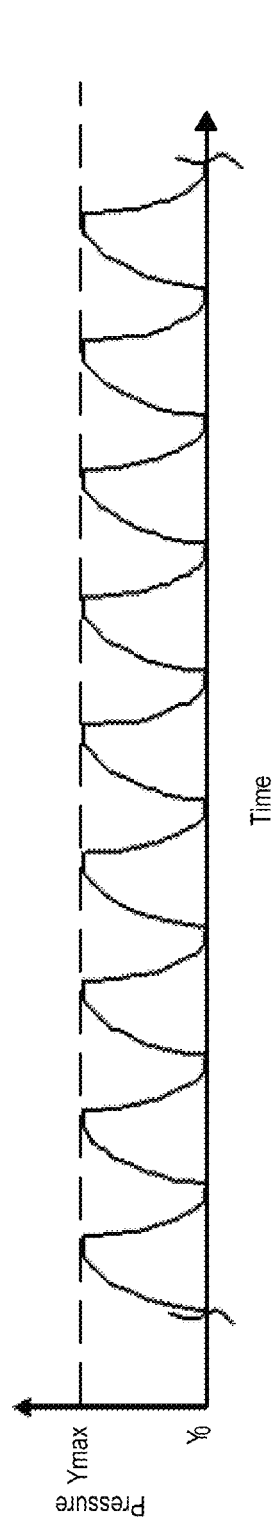
FIG. 1 shows a graph of a typical air/vacuum output of a pulsator that is supplied to a pulsation chamber.

FIG. 1 shows a graphical representation of prior art pulsator output. In the prior art, a pulsator 16 provides a periodically changing pressure that is supplied to the pulsation chamber 10 of the milking machine to enable the liner 8 to open and close as the teat cup 4 is applied to the teat 2 of the animal. The pressure periodically varies between low pressure, such as a vacuum, indicated on the graph by $Y_{max}$ and a higher pressure, such as atmospheric pressure, indicated on the graph by $Y_0$ to enable the liner to open and close. Prior art pulsator designs may provide different frequencies of the periodic changing pressure and different time ratios between time spent at low pressure and high pressure. The frequency of pressure changes and the percentage of time at either low or high pressure is a function of specific pulsator designs.

FIGS. 2 and 3 show an open position and closed position of the liner 8 of the teat cup 4 respectively. A hollow teat cup 4 is coupled to a pulsator 16 through a pulse tube 6. Within the hollow teat cup 4 is an inflatable liner 8 that receives the teat 2 of the animal to be milked. A pulsation chamber 10 is present between the inflatable liner 8 and the teat cup 4. Alternate pressurization and depressurization of the pulsation chamber 10 by the pulsator 16 through pulse tube 6 due to the application of air or a vacuum causes the liner 8 to open and close around the teat 2 of the animal.

When the pulsation chamber 10 is exposed to air by the pulsator, the liner 8 collapses or closes around the teat 2, the pressure of the collapsed liner 8 is applied to the teat and no milk flows from the teat 2 as shown in FIG. 3. The collapsing of the liner 8 on the teat 2 is referred to as rest phase.

When the pulsation chamber 10 is exposed to a vacuum by the pulsator 16, the liner 8 opens around the teat 2 and milk 14 flows out of the udder as shown in FIG. 2. The opening of the liner around the teat is referred to as milk phase.

During normal or typical milking operation, the pulsator 16 alternates between milk phase and rest phase by alternating pressurization and depressurization of the pulsation chamber 10. An end of the teat cup 4 opposite the end that receives the teat 2 is connected to a milk tube 12 coupled to a claw (not shown).

An embodiment of the invention describes a method of attaching or removing a teat cup 4 and liner 8 on the teat 2 of an animal.

Before the teat cup 4 is on the teat 2, the liner 8 within the teat cup 4 is held in an open position during an attachment period, as shown in FIG. 2, so that the teat 2 can be quickly, efficiently and properly inserted into the liner 8.

After the teat 2 has been properly inserted into the liner 8, the pulsation—normal opening and closing of the liner 8—resumes for milking of the animal.

The liner 8 may also be held open during removal of the teat 2 from the teat cup 4 and liner 8 so that the teat 2 can be quickly and efficiently removed.

Normal liner action, e.g. opening and closing of the liner 8, may follow the removal of the teat cup 4 from the animal.

In an embodiment of the invention, the method of attaching or removing the teat cup and liner from the animal can be used during both the machine attachment and removal period of the teat cup to the animal or for only one of either of the aforementioned time periods.

Figure 4:
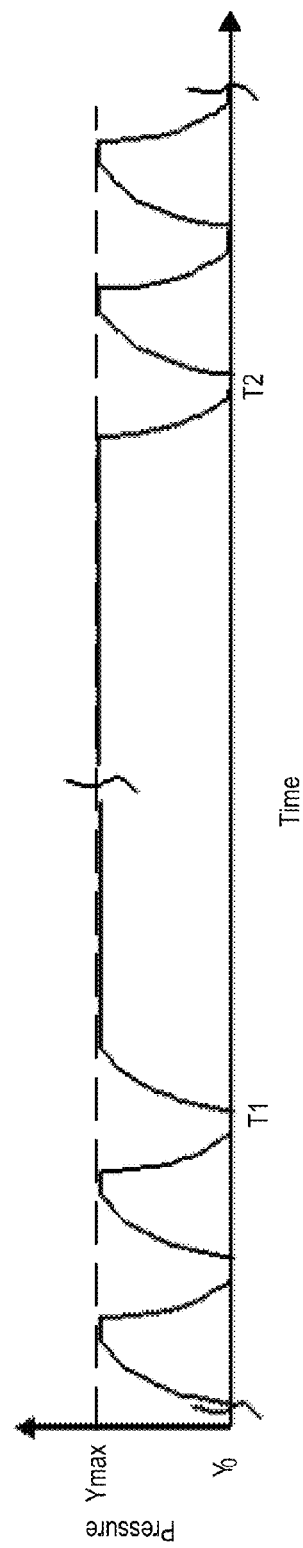
FIG. 4 illustrates a graph of the air/vacuum output of an embodiment of the present invention.

FIG. 4 shows a graphical representation of pulsator output for a pulsator system of an embodiment of the present invention. At time T1, prior to placing the teat cup 4 on the animal, the pressure output is maintained at a low pressure, such as a vacuum, indicated on the graph by $Y_{max}$, to hold the liner 8 of the teat cup 4 in an open position, e.g. generating a constant milk phase of the pulsator.

The pressure is maintained at this level for a sufficient time period (the attachment time period) to permit the attachment of the teat cup 4 onto the animal. At time T2, the milking time period starts. At time T2, after the teat cup 4 has been placed on the animal, the pulsator begins providing periodic changes in pressure output to enable the liner 8 of the teat cup 4 to periodically close and open, providing milk phase and rest phase as present during normal operation. The air/vacuum output may change with some frequency prior to attachment of the milking machine which starts at approximately time T1. The attachment time period may be manually started and stopped by an operator or automated. If the attachment time period is automated, the milking time period may be set to a certain amount of allotted time. Similarly, the milking time period may also be manually started and stopped by an operator or automated. If the milking time period is automated, it may be set to a certain amount of allotted time or may end based on the amount of milk flow or automated. If the milking time period is automated, it may be set to a certain amount of allotted time or may end based on the amount of milk flow.

In an alternate embodiment, the teat cup 4 may be removed from the animal and would present as shown in FIG. 4, except T1 would be the removal time period, such that the pressure output is maintained at a low pressure, for example a vacuum, to ensure easy removal of the teat cup 4 from the animal. After the teat cup 4 has been removed from the animal, the pulsator resumes normal operation. The removal time period may be manually started and stopped by an operator or automated. If the removal time period is automated. If the removal time period is automated, it may be set to a certain amount of allotted time or may end based on the amount of milk flow or cessation of milk flow.

Figure 5:
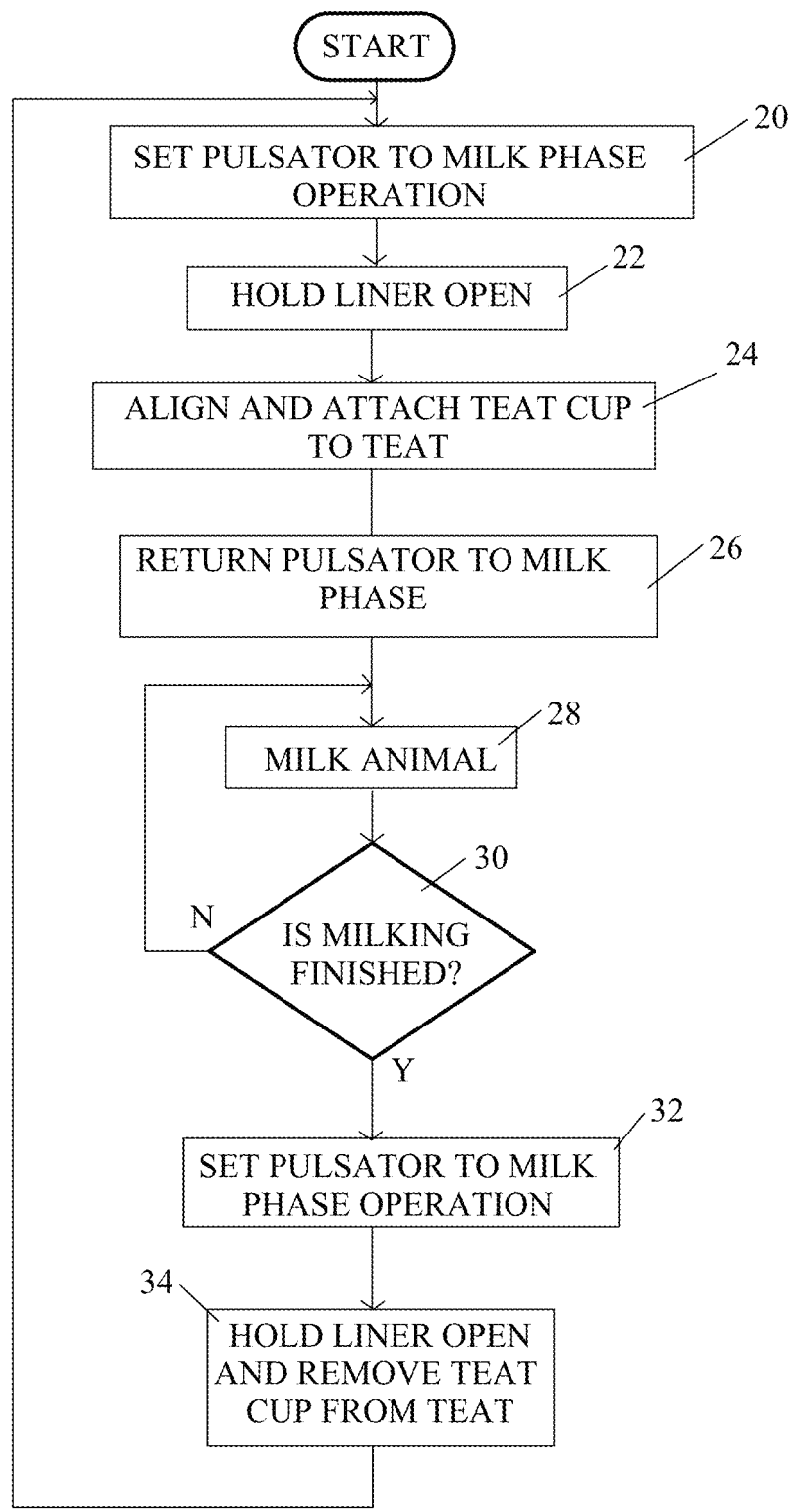
FIG. 5 shows steps for attaching and detaching the milking machine to the animal being milked.

FIG. 5 shows a flowchart of the steps for attaching or removing a teat cup from an animal, such that the pressure output from the pulsator is maintained at a low pressure, such as a vacuum, or in milk phase to hold the liner 8 of the teat cup 4 in an open position.

First, a pulsator is set to a constant milk phase or to expose the pulsation chamber to a vacuum or milk phase operation (step 20). Then the vacuum moves the liner to an open position and maintains the liner in an open position for an attachment time period (step 22). Then teat cup is attached and aligned with the teat of the animal (step 24). The pulsator is set to return to milk phase where vacuum and air alternately pressurize and depressurize the pulsation chamber to cause the liner to open and close and therefore alternate between milk phase and rest phase (step 26) and the animal is milked (step 28). If the milking is not finished (step 30), return to step 28 and continue milking the animal. If the milking is finished (step 28), set the pulsator to milk phase operation (step 32) and hold the liner to an open position for a detachment or removal time period and remove the teat cup from the animal (step 34). After the teat cup has been removed, return to step 20 of setting the pulsator to a constant milk phase.

It should be noted that while the removal of the teat cup and the attachment of the teat cup are shown as both occurring during the milk phase (e.g. when the liner is an open position), the teat cup may be attached only during milk phase and removed during alternate pressurization and depressurization of the pulsation chamber or the teat cup may only be removed during milk phase and the teat cup attached during alternate pressurization and depressurization of the pulsation chamber of the teat cup without departing in scope from the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of attaching and/or removing a teat cup with a liner inflatable and deflatable by a pulsator which alternately introduces air and vacuum to a pulsation chamber surrounding the liner, to and/or from a teat of an animal, the method comprising the steps of:

setting the pulsator to constantly introduce vacuum at a low pressure to the pulsation chamber to open and maintain the liner in a full open position for an attachment time period;

attaching the teat cup to the teat of the animal during the attachment time period wherein the attachment time period extends for a time sufficient to allow the liner to be properly aligned with the teat of the animal and the teat to be completely inserted into the liner;

setting the pulsator to alternate between introducing air at a high pressure and vacuum at the low pressure to the pulsation chamber during a milking time period to milk the animal; and removing the teat cup from the teat of the animal.

2. The method of claim 1, wherein the teat cup is completely removed from the teat of the animal by setting the pulsator to constantly introduce vacuum to the pulsation chamber to fully open and maintain the liner in an open position for a removal time period.

3. The method of claim 2, wherein the removal time period is started manually by an operator.

4. The method of claim 2, wherein the removal time period ends after a timed period.

5. The method of claim 1, wherein the attachment time period is started manually by an operator.

6. The method of claim 1, wherein the milking time period is started manually by an operator.

7. The method of claim 1, wherein the milking time period ends after a timed period.

8. The method of claim 1, wherein the milking time period ends based on milk flow from the animal.

\* \* \* \* \*